(12) United States Patent
Mondal

(10) Patent No.: US 7,286,546 B2
(45) Date of Patent: Oct. 23, 2007

(54) METHOD AND SYSTEM FOR PROVIDING RELIABLE AND FAST COMMUNICATIONS WITH MOBILE ENTITIES

(75) Inventor: Abdul Sakib Mondal, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 1113 days.

(21) Appl. No.: 10/209,964

(22) Filed: Jul. 31, 2002

(65) Prior Publication Data
US 2004/0052265 A1 Mar. 18, 2004

(51) Int. Cl.
*H04L 12/56* (2006.01)

(52) U.S. Cl. ............... 370/401; 370/278; 370/394; 709/249

(58) Field of Classification Search ........ 370/352–356, 370/400, 401, 466, 467, 469, 250, 252, 490, 370/389, 402, 394, 278, 282; 709/224, 249, 709/245, 219, 229; 455/427

See application file for complete search history.

(56) References Cited

U.S. PATENT DOCUMENTS

| | | | |
|---|---|---|---|
| 5,659,723 A | 8/1997 | Dimitrios et al. | 707/103 R |
| 5,912,878 A | 6/1999 | Park et al. | 370/229 |
| 6,091,733 A | 7/2000 | Takagi et al. | 370/401 |
| 6,163,781 A | 12/2000 | Wess, Jr. | 707/103 X |
| 6,167,564 A | 12/2000 | Fontana et al. | 717/104 |
| 6,272,148 B1 | 8/2001 | Takagi et al. | 370/469 |
| 6,400,722 B1 * | 6/2002 | Chuah et al. | 370/401 |
| 2006/0230182 A1 * | 10/2006 | Furukawa et al. | 709/245 |

OTHER PUBLICATIONS

Adler, Richard "Emerging Standards for Component Software", IEEE Computer, 28(3): pp. 68-77 Mar. 1995.

Allen, R. et al., "A Formal Basis for Architectural Connection", ACM Transaction on Software Engineering and Methodology, vol. 6, No. 3, Jul. 1997, pp. 213-249 and Errata Vo. 7, No. 3, Jul. 1998, pp. 333-334.

Brown, A. et al., "An Examination of the Current State of CBSE: A Report on the ICSE Workshop on Component-Based Software Engineering", Carnegie Mellon Software Engineering Institute 1998, pp. 1-7.

Clements, Paul, "From Subroutines to Subsystems: Component-Based Software Development", American Programmer, vol. 8, No. 11, Nov. 1995, pp. 3-6.

D'Souza, D. et al., Objects, Components, and Frameworks with UML the Catalysis Approach, Addison-Wesley Object Technology Series, Chps. 14-16, pp. 543-680.

(Continued)

*Primary Examiner*—John Pezzlo
(74) *Attorney, Agent, or Firm*—Klarquist Sparkman, LLP

(57) ABSTRACT

A gateway module is provided for connecting multiple networks. A connection set up module is provided. The connection set up module is configured to set up a transport layer connection between two correspondent nodes in first and second wire networks in divided forms of first and second connections. The first and second connections are in a transport layer protocol suitable for communications with correspondent nodes in the first and second wire networks. A control module controls the connection set up module by determining whether or not to carry out a connection set up by the connection set up module. The connection set up is made according to information content of a packet. The packet contains a transport layer protocol data unit, from a correspondent node in the second network, that requests a set up of the transport layer connection between the first and second networks.

27 Claims, 6 Drawing Sheets

OTHER PUBLICATIONS

DeMarco, T., et al., Structured Analysis and System Specification, Prentice Hall 1979, Chps. 1-3, pp. 3-44.

Fowler, M., et al., UML Distilled Applying the Standard Object Modeling Language, Addison-Wesley, 1997, Chps. 1-2, pp. 1-41.

Gamma, E., et al., Design Patterns Elements of Reusable Object-Oriented Software, Addison-Wesley 1995, Chp. 1, pp. 1-29.

Henderson, P., et al., "Behavioural analysis of component-based systems", Information and Software Technology, vol. 43, No. 3, pp. 161-169, 2001.

Jacobson, I., et al., Object-Oriented Software Engineering A Case Driven Approach, Addison-Wesley, Rev. 4th pr., 1997, Chp. 5, pp. 84-105, Chp. 6, pp. 109-151, Chp. 16, pp. 474-500.

Jacobson, I., et al., The Unified Software Development Process, Addison-Wesley, 1999, Chps. 12-17, pp. 319-419.

Keller, R., et al., "Design Components: Towards Software Composition at the Design Level", proceedings of the Twentieth International Conference on Software Engineering, Kyoto, Japan, Apr. 1998, pp. 302-311.

B. Korel, "Black-Box Understanding of COTS Components", proceedings of the 7th international workshop on program comprehension, 1999 (no pages specified).

Lee, S.D, et al., "COMO: A UML-Based Component Development Methodology", proceedings from the 6th Asia Pacific Software Engineering Conference, Takamatsu, Japan, 1999, pp. 54-61.

McIlroy, M.D., "Mass Produced Software Components", Software Engineering NATO Science Committee, Jan. 1969 pp. 138-155.

McMenamin, S., et al., Essential Systems Analysis, Yourdon Press, 1984, Chps. 7-10, pp. 47-115.

Nierstrasz, O. et al., "Component-Oriented Software Development", Communications of the ACM, vol. 35, No. 9, Sep. 1992, pp. 160-165.

Oestereich, B., Developing Software with UML Object-Oriented Analysis and Design in Practice, Addison Wesley Langman Ltd., Jan. 1999, Chp. 1, pp. 1-16, Chp. 1, pp. 276-285.

Shaw, M., et al., "Abstraction for Software Architecture and Tools to Support Them", IEEE Transactions on Software Engineering, vol. 21, No. 4, Apr. 1995, pp. 314-335.

Sullivan, K., et al., "Using Formal Methods to Reason about Architectural Standards", 19th International Conference on Software Engineering, Boston , 1997, pp. 503-513.

Sutherland, D., Business Object Design and Implementation III, OOPSLA 99 Workshop Proceedings, Springer Nov. 1999, pp. 39-62 and 131-146.

Szyperski, C., Component Software Beyond Object-Oriented Programming, ACM Press and Addison Wesley Publication, 1998, Chps. 1-3 and pp. 1-25.

Veryard, R. "SCIPIO Aims, Principles and Structure", SCIPIO Consortium, Beta Version 0.9, Apr. 1998, pp. 1-18.

Brakre, A.V. et al. "Implementation and Performance Evaluation of Indirect TCP" *IEEE Transactions on Computers* 46(3):260-278 (1997).

Brakre, A.V. et al. "I-TCP: Indirect TCP for Mobile Hosts" *Proc. of the Int. Conf. on Dist. Comp. Sys.* Conf. 15:136-143 (1995).

Balakrishnan, H. et al. "Improving TCP/IP performance over wireless networks" *Proc. of 1st Int. ACM Conf. on Mobile Computing and Networking (MOBICOM)* (1995).

Balakrishnan, H. et al. Improving Reliable Transport and Handoff Performance in Cellular Wireless Networks *ACM Wireless Networks* 1(4):469-482 (1995).

Balakrishnan, H. et al. "A Comparison of Mechanisms for Improving TCP Performance over Wireless Links" *Proc. ACM SIGCOMM* (1996).

Balakrishnan, H. et al. "The Effect of Asymmetry on TCP Performance" *Proc. ACM MOBICOM* (1997).

Balakrishnan, H. et al. "TCP Improvements for Heterogeneous Networks: The Daedalus Approach" *Proc. of 35th Annual Allerton Conference on Communication, Control and Computing*.

Caceres, R. et al. "Improving the performance of reliable transport protocols in mobile computing environments" *IEEE J. on Sel. area in Comm.* 13(5):850-857 (1995).

Fladenmuller, A. et al. "The effects of Mobile IP handoffs on the performance of TCP" *Mobile Networks and Applications* 4:131-135 (1999).

Marzoni et al. "Impact of mobility on TCP/IP: an integrated performance study" *IEEE J. on Sel. Areas in Comm.* 13(5):858-867.

El Malki et al. "Fast Handoff Method for Real-Time Traffic over Scalable Mobile IP Networks" Globecom.net (internet draft) University of Sheffield (1999).

Abdul Sakib Mondal, "Improving the performance of handoff in mobile IP," <http://www.infosys.com/technology/CRN-0104-01.pdf>, 2 pages, dated Apr. 1, 2001 (accessed Jan. 25, 2007).

* cited by examiner

FIG. 1

Handoff of mobile IP node without the support of a foreign agent and/or without the support of multicasting

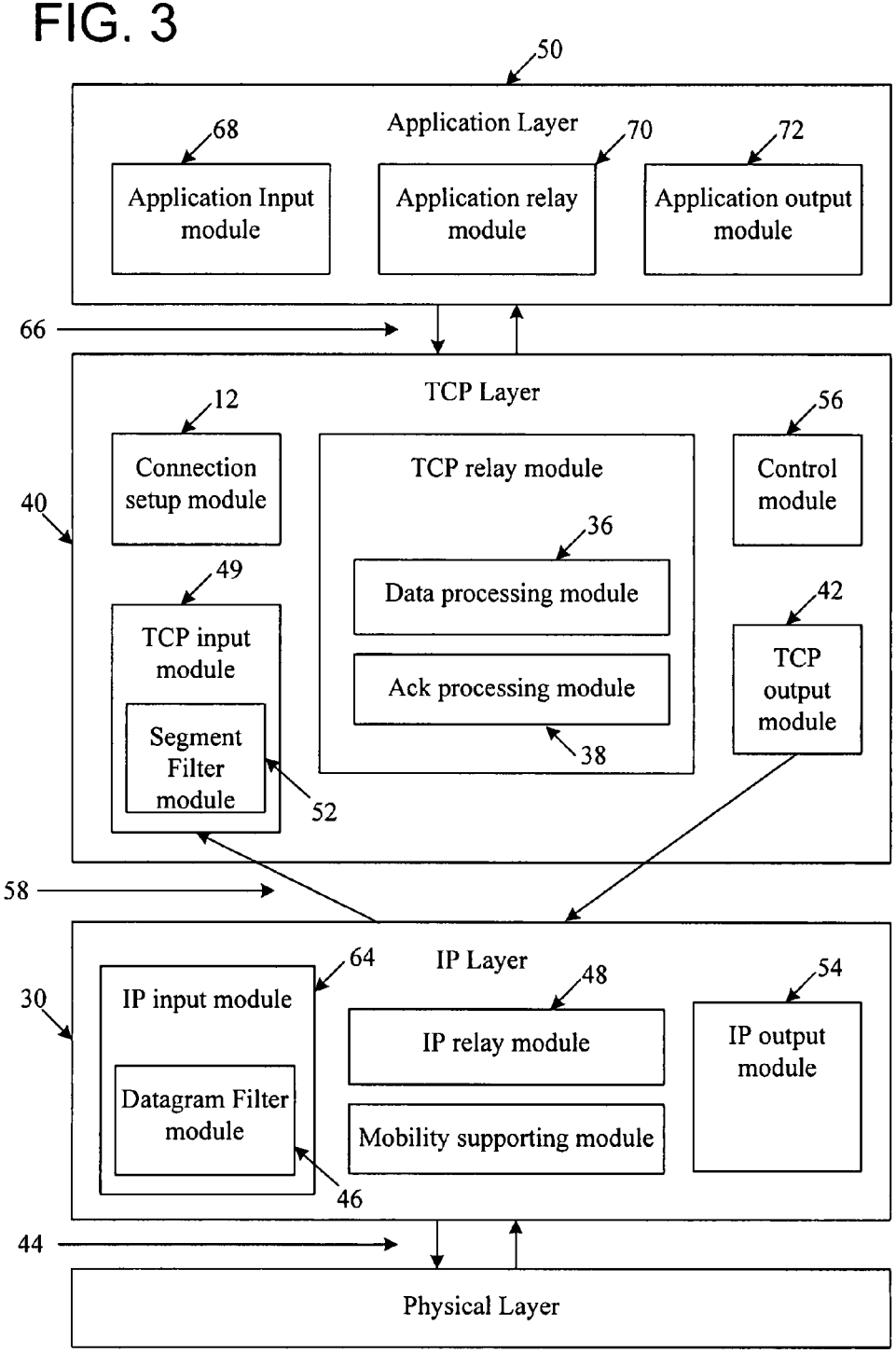

METHOD AND SYSTEM FOR PROVIDING RELIABLE AND FAST COMMUNICATIONS WITH MOBILE ENTITIES

BACKGROUND

1. Field of the Invention

The present invention relates to a gateway module, and its methods of use, and more particularly to a gateway module for realizing a communication protocol containing a transport layer and a method to control a gateway module in a communication network.

2. Description of the Related Art

The IETF has proposed Mobile IP as a solution to the problem of providing communication support to IP-based mobile devices during the change of their points of attachment. The proposed solution includes the following, (i) a mobile node that has software running on the mobile node and (ii) a home agent that keeps track of the mobile node, intercepts the packet for the mobile node, and tunnels the packet to the mobile node. When a mobile node moves to a different network, it may get its IP address from the network or can attach itself to a software unit, called a foreign agent, in the network. Correspondingly, the home agent may send the packet directly to the mobile node or via the foreign agent.

In recent years there are increasing demands for realizing data communications with a mobile IP-based host. TCP (Transmission Control Protocol) is widely used as a reliable transport layer protocol in the wire data communications. However, the direct application of this protocol to mobile IP communications creates a number of problems.

A TCP segment loss implies that there is congestion of a network. TCP is designed to avoid the congestion by lowering a data transmission rate when the segment loss is detected. For this reason, Mobile IP has the effect of performance degradation of TCP. This occurs during the handoff process when a mobile node moves from its present network (A) to a different network (B). During this movement, there is no entity in network A to send acknowledgements to the packets meant for the mobile node. This causes non-receipt of acknowledgement of packets at a TCP sender that in turn assumes it to be loss of TCP segments. The TCP segment loss due to a handoff is interpreted as the congestion. This causes congestion avoidance operations to be executed more than necessary. As a result the throughput is lowered more than necessary.

One proposal to remedy this problem is to use a modified form of TCP. This is a scheme in which the data loss due to handoff is handled in such a way that a re-transmission is carried out as if data loss was not caused by congestion. This is done by a method in which the transport layer connection is divided into two by breaking the connection at the gateway and relaying data between the two connections. However, this violates the end-to-end semantics of the TCP. TCP requires a guarantee that data of interest has reached a receiving side terminal. Hence an acknowledgement "ack" for that data is sent when the data is received by the receiving side terminal. The fact that the gateway for carrying out the TCP relay at a gateway returns an "ack" for data to the transmitting side when that data is received at the gateway, may not meet the guarantee.

Application layer protocols utilizing TCP include those that require preservation of end-to-end semantics and those that do not. In HTTP, the client sets up a TCP connection prior to an individual HTTP request, and the server disconnects a TCP connection after a response to the HTTP request is transmitted from the client. In this case, the request is completed by a response by the application layer so that no problem arises even when the end-to-end semantics of the TCP are changed. However, it is preferable to preserve the end-to-end semantics of the TCP for protocols such as TELNET (remote terminal protocol).

Further, when it becomes necessary to relay a TCP connection at a gateway as a mobile node carries out handoff, there is a need to set up the gateway to establish a state that is capable of communicating through TCP with the mobile node after its movement. This establishment of a state takes some time and the throughput is lowered when the mobile node carries out the handoff. Additionally, the transmitting side of the TCP determines Retransmission Time Out ("RTO") according to the observed RTT. As RTO becomes large, the re-transmission wait time at a time of TCP segment loss also increases and the throughput is lowered.

By way of example, consider a case where the gateway transmits "ack" for some data with respect to the transmitting side terminal, and before the transmission of that data to the receiving side terminal succeeds. In this case, the transmitting side terminal discards that data from a re-transmission buffer upon receiving "ack" so that it becomes impossible to retransmit that data. Namely, the TCP connection is a transport layer protocol that is aimed at realizing reliable communications but the introduction of gateway has a contrary effect of lowering the reliability of the TCP.

In the TCP layer and the Internet Protocol ("IP") layer, it is possible to utilize standard additional functions that are provided as options. Here, the options include a search of Maximum Transfer Unit ("MTU") which is the maximum packet size that can be transferred without fragmentation on a path between communicating terminals. This procedure is called a path MTU discovery. It avoids spending wasteful processing time because no fragments are produced at intermediate routers and the like on the path.

Information for controlling such options is included in the TCP header. A terminal X that wishes to utilize the option transmits a TCP segment having a header with this option attached thereto at a time of requesting the TCP connection establishing. Upon receiving this TCP segment having a header with the option attached, a terminal Y carries out a prescribed option processing and determines whether to permit or refuse that option. Terminal Y then transmits a TCP segment that contains information on permission/refusal. When this information indicates the permission, the optional function is executed. When this information indicates the refusal, the optional function is not executed.

A decision must be made whether or not to permit the option between terminals that set up the connection. In the case of relaying the connection at a gateway, the connection is set up in divided form upon receiving the TCP "connection establishing" request at the gateway. This becomes a problem because the two connections may have different MTU and hence, this may necessitate fragmentation at the gateway. In TCP, the management of a series of processing in the sequence of connection establishment, data transmission and reception and then disconnection, is realized by using a TCP state transition diagram. The transmission and reception of actual user data are carried out in the "ESTABLISHED" state. A "CLOSED" state corresponds to a period beginning with the connection release and continuing until the connection is established, i.e., no connection exists in this state. SYN SENT, SYN RCVD and LISTEN are "connection establishing" phases. Similarly, there are different states for "connection release" phases. There are a few more states in TCP An end point of a TCP connection can be in any of these states. Hence, in the case of carrying out an operation to shift an end point of the TCP connection there is a possibility of falling into an unstable state. This may result in incorrect operation of TCP.

Coming back to the issues of mobile IP performance, there are two broad approaches proposed as solution to improve TCP performance during handoff in mobile IP. The first is through hierarchical foreign agents (HFA). In this approach foreign agents are arranged in hierarchical manner, and movement of the mobile node within the networks is handled by registration with the lowest possible common intermediate foreign agent common to both the networks. This has the effect of reduced time for handoff. Because of the fast handoff, the TCP performance degradation is less severe. However, the degradation can be further avoided by buffering packets at the foreign agent of the first network from which the mobile node moved. Once the mobile node has reached the destination network, the former foreign agent forwards the received packets to the foreign agent of the mobile node in the second network.

After this handoff, correspondent node communicates with the foreign agent in the second network. However, during the handoff, the correspondent node continued its communication through TCP with the foreign agent at the first network. Therefore, there is no performance degradation due to false congestion. It is to be noted that this requires support of foreign agents in the networks that the mobile node travels. At this moment, however we cannot expect support of foreign agent in each network. Therefore this approach has limited applicability.

The second approach uses multicasting. In this approach, when a mobile node moves from a first network to a second network, the packet is multicast to both the networks. This prevents loss of packet during handoff. This approach requires support of multicast routers over the Internet. Again, the Internet may not fulfill this.

Hence, there is a need for an improved gateway module and control methods that can be used to provide efficient handoff of mobile IP. There is another need for a gateway module and control methods that provide improved performance during handoff that does not require support of multicasting or a foreign agent. There is a further need for a gateway module where both the gateway and mobile node are under one administrative control authority.

SUMMARY

An object of the present invention is to provide gateway modules, and their methods of use, that improve TCP performance during handoff.

Another object of the present invention is to provide gateway modules, and their methods of use, that improve TCP performance during mobile IP handoff without the support of a foreign agent.

Yet another object of the present invention is to provide gateway modules, and their methods of use, that improve TCP performance that are suitable for movement of a mobile node across any set of networks.

A further object of the present invention is to provide gateway modules, and their methods of use, that improve TCP by breaking the TCP connection between a correspondent node and the mobile node into two sub-connections.

Another object of the present invention is to provide gateway modules, and their methods of use, that improve TCP by breaking the TCP connection between a correspondent node and the mobile node into two sub-connections to prevent false network congestion problems that can occur when a handoff starts.

These and other objects of the present invention are achieved in a gateway module for connecting multiple networks. A connection set up module is provided. The connection set up module is configured to set up a transport layer connection between two correspondent nodes in first and second wire networks in divided forms of first and second connections. The first and second connections are in a transport layer protocol suitable for communications with correspondent nodes in the first and second wire networks. A control module controls the connection set up module by determining whether or not to carry out a connection set up by the connection set up module. The connection set up is made according to information content of a packet. The packet contains a transport layer protocol data unit, from a correspondent node in the second network, that requests a set up of the transport layer connection between the first and second networks.

In another embodiment of the present invention, a gateway module in a communication network is interconnected with a plurality of networks. A connection set up module sets up a transport layer connection between first and second wire networks. The transport layer connection is in divided forms of first and second connections, in a transport layer protocol, for communications with correspondent nodes in the first and second wire networks. A control module shifts the second connection when the correspondent node in the second wire network has moved from the second network to a third network. The second connection is established to the attachment point of the correspondent node in the third network.

In another embodiment of the present invention, a gateway control method is provided in a communication network. A plurality of networks are interconnected. The gateway module has a connection set up module for setting up a transport layer. The transport layer provides a connection between first and second wire networks in, divided forms of first and second connections, in a transport layer protocol, for communications with the correspondent nodes in the first and second wire networks. A data processing module and an acknowledgement processing module are included. The data processing module is used to determine if data received from the first connection is new. The new data received is buffered and then forwarded. The acknowledgement processing module is used to acknowledge data received over the first connection. Acknowledgements, received over the second connection, are processed by the acknowledgement processing module.

BRIEF DESCRIPTION OF THE DRAWINGS

FIG. 1 is a flowchart that illustrates one embodiment of a method of the present invention for mobile IP handoff without the support of a foreign agent.

FIG. 3 is a schematic diagram of one embodiment of a gateway of the present invention.

DETAILED DESCRIPTION OF THE PREFERRED EMBODIMENTS

In one embodiment, the present invention provides a gateway module, and control methods, that are used to provide efficient handoff of mobile IP. The modules and methods of the present invention can use a relay of connection at the gateway to provide improved performance during handoff. This improved handoff can be achieved without support of multicasting or foreign agents as illustrated in FIG. 1. Additionally, gateway modules and methods of the present invention allow gateway and mobile nodes to be controlled by one administrative control authority.

The Gateway module and methods of use of the present invention, can be utilized with a wide variety of networks including but not limited to wireless IP networks, and the like. In the embodiment where the gateway module of the present invention is a wireless IP network, any combination of networks A to E can be wireless. In one embodiment of the present invention, any changes in the types of networks are reflected in the physical and link layer protocols but not in higher layers.

Figure 2A:
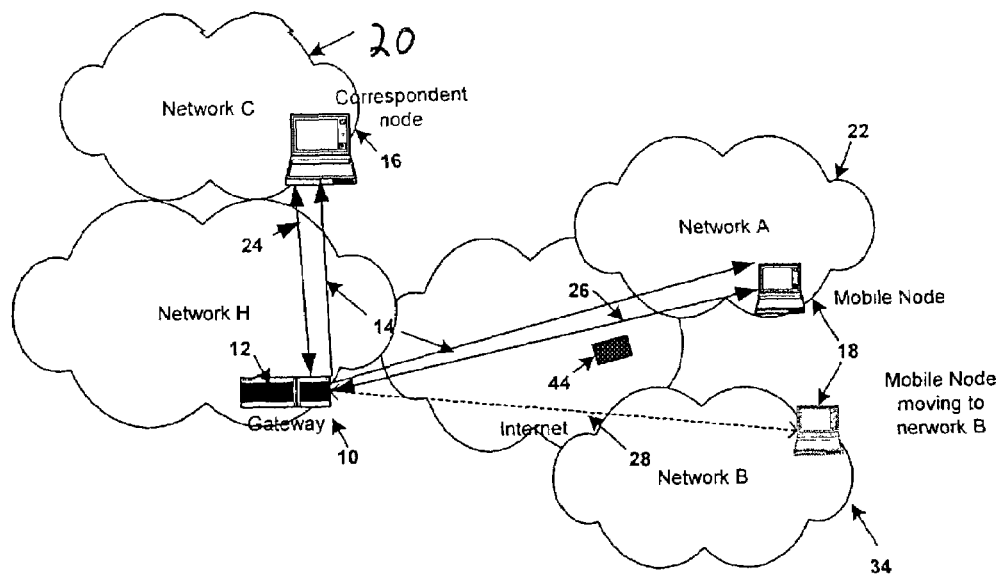
FIG. 2(a) is a schematic diagram that illustrates one embodiment of an application of a gateway module of the present invention.
Figure 2B:
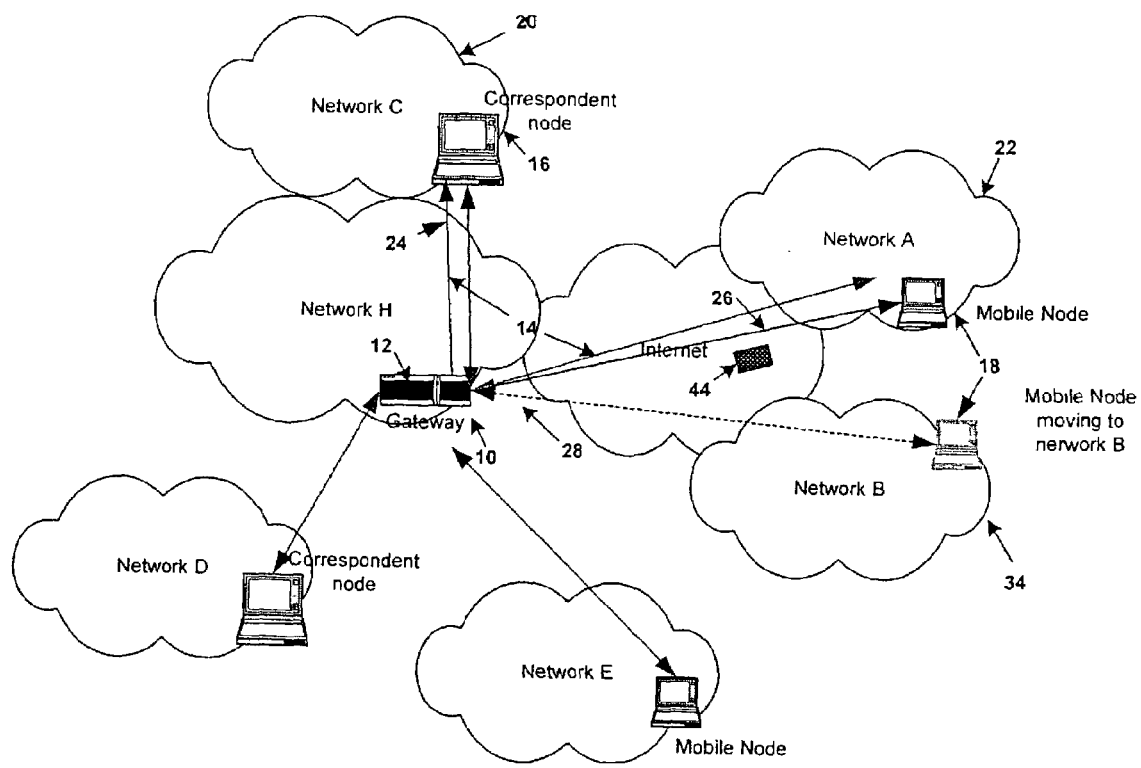
FIG. 2(b) is another schematic diagram that illustrates another embodiment of an application of a gateway module of the present invention.

Referring now to FIGS. 2(a) and 2(b), various embodiment of a gateway module 10, for connecting multiple networks, are illustrated. A connection set up module 12 is provided. Connection set up module 12 is configured to set up a transport layer connection 14 between two correspondent nodes 16 and 18 in first and second wire networks 20 and 22, in divided forms of first and second connections 24 and 26. It will be appreciated that the present invention can be utilized with any number of networks, correspondent nodes and mobile nodes. For example, there can be correspondent nodes at networks B, D, E and H communicating to the mobile node in network A using the same gateway 10 concurrently (FIG. 2(b)).

By way of example, and without limitation, FIG. 2(b) shows another mobile node in network E that uses the same gateway 10 concurrently. In FIG. 2(b), connection set up module 12 can shift connection 26 from node 18 of network 22 when it has moved from network 22 to a third network 34. In this embodiment, a connection, generally denoted as 28, is established to the attachment point of the mobile node 18 in third network 34.

In another embodiment of the present invention (as shown in FIG. 3), gateway module 10 includes a data processing module 36 and an acknowledgment processing module 38.

Data processing module 36 determines if data received from connection 24 is new. New data is then buffered and forwarded. An acknowledgement processing module 38 acknowledges the data received over connection 24. Acknowledgements received over connection 26 are also processed by acknowledgement processing module 38.

Both data processing module 36 and acknowledgement processing module 38 wait for any received transport protocol data unit. Both modules 36 and 38 work on the same transport protocol data unit. However, acknowledgement processing module 38 is interested in the acknowledgement field of the data and acts accordingly.

Data processing module 36 acts with acknowledgement processing module 38 and may cache data, retransmit data, discard data, and the like. Data processing module 36 can be symmetric, and hence the discussion holds true if the connection 24 and 26 are interchanged.

First and second connections 24 and 26, for communications with correspondent nodes 16 and 18 in first and second wire networks 20 and 22, are in a transport layer protocol layer module 40 in FIG. 3. Transport protocol layer module 40 provides a connection-oriented reliable transport of data packets between two hosts. A connection is set up through a three-way handshake between two hosts (end-points).

The process consists of the following three sequential steps (i) sending SYN from the sender, (ii) sending SYN and ACK from the receiver, and (iii) sending ACK from the sender.

Each transport protocol data module 58 is given a sequence number and a timer is started after sending a transport protocol data module through an output module 42. A receiver host acknowledges receipt of the data over the connection by sending an acknowledgement. The acknowledgement is essentially the sequence number of the last correctly received data unit.

Figure 4:
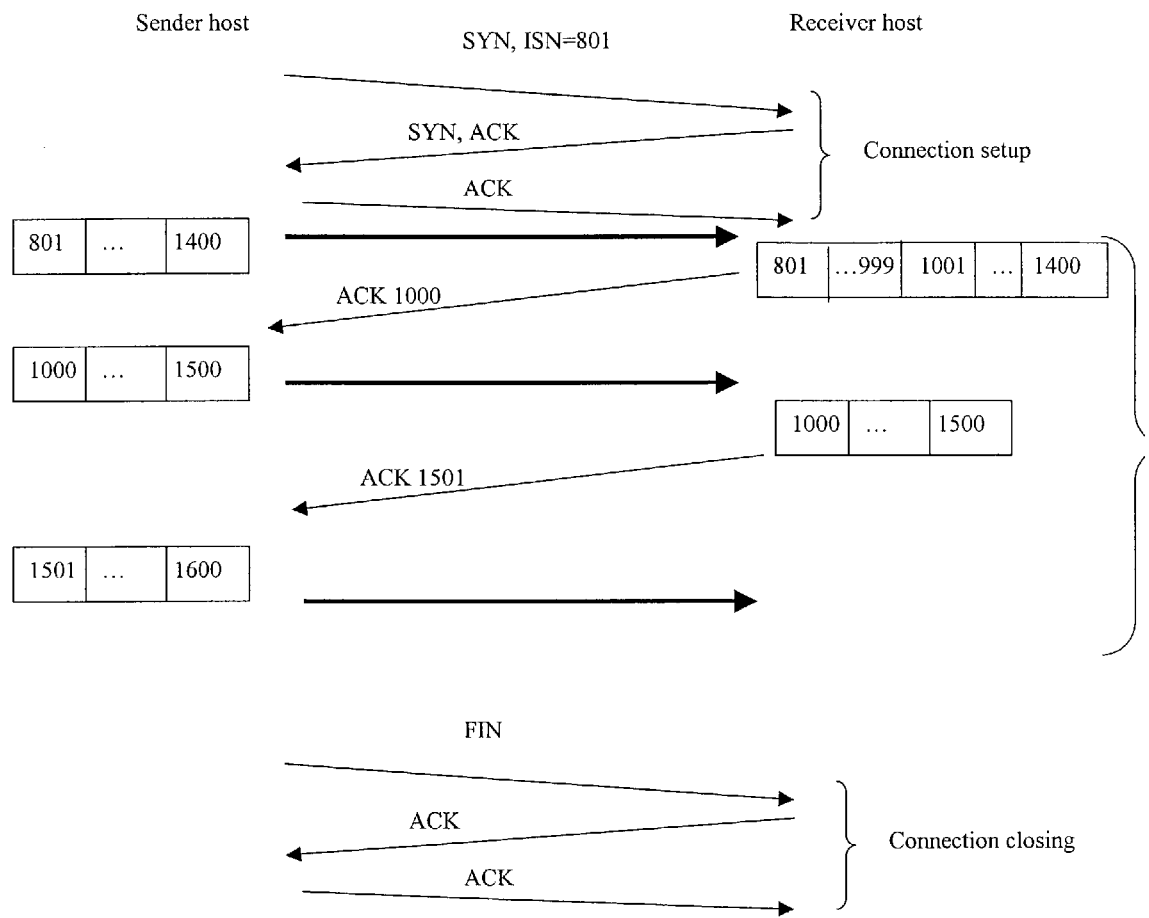
FIG. 4 is a schematic diagram that illustrates connection setup, data transmission and connection closing in a TCP protocol for one embodiment of the present invention.

As illustrated in FIG. 4, acknowledgement is cumulative. By way of illustration, and without limitation, if the last data unit acknowledged is 1000 than all data with a sequence number less than 1000 must have been correctly received by the receiver. Based on the sequence number of the acknowledgement received within the timeout period, as set in a timer, the sender may retransmit a data unit. If acknowledgement does not arrive within the timeout period, the corresponding packet is considered to be lost and hence retransmitted. A connection is closed through a handshake process between the end-points.

Referring again to FIG. 3, transport layer processing module 40 receives a transport layer protocol data unit 58 (extracted from datagram 44) from a lower Internet Protocol (EP) layer 30 if the datagram filter module 46, more fully described hereafter, decides that datagram 44 is to be forwarded to transport layer processing module 40 and a protocol identifier in the datagram 44 indicates a connection oriented protocol. Otherwise, datagram 44 is relayed by IP relay module 48.

Transport layer protocol processing module 40 carries out the transport layer protocol processing. Transport layer processing module 40 processes an incoming datagram 44 through an input module 49 and may pass datagram 44 to an appropriate application processing module 50 or relay it to the transport output module 42. This decision is then taken through a segment filter module 52. Outgoing data is processed by transport layer output module 42 before passing it to the IP layer 30. Outgoing data is passed on to the lower layers, both link and physical, by IP layer 30 after processing it through an IP output layer 54.

A control module 56 is provided. Control module 56 controls connection set up module 12 by determining whether or not to carry out a connection set up by connection set up module 12. The connection set up is made according to information content of a packet. The packet contains a network protocol data unit 44, also known as a datagram, that in turn contains a transport layer protocol data unit 58, (also called segment) and a transport layer header, from a correspondent node, such as 18, in second network 22.

A transport layer header contains source and destination ports that are used to indicate the application at the two end-points of the connection. A network protocol data unit 44 requests a set up of transport layer connection 14 between first and second networks 20 and 22. The network protocol data can include an extension utilized to request splitting the connection 14 into two connections. On processing this request, connection set up module 12 will have enough information to set up connections 24 and 26.

Figure 6:
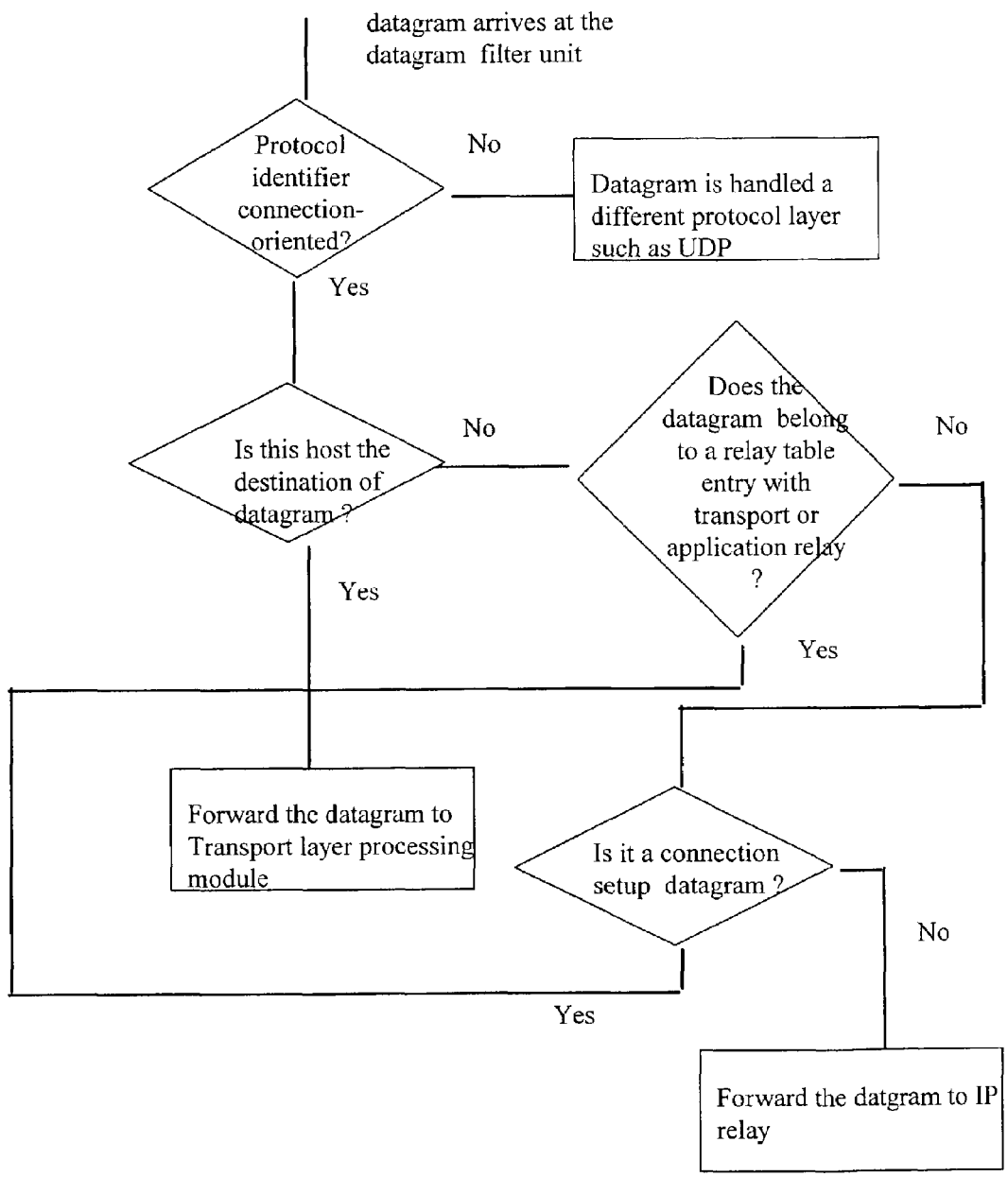
FIG. 6 is a flowchart that illustrates the working of a Datagram filter unit that can be utilized with various embodiments of gateway modules of the present invention.

An IP input module 64 contains datagram filter module 46, more fully illustrated in FIG. 6. Datagram filter module 46 forwards a datagram 44 to the transport layer if datagram 44 has the same destination as that of the gateway. Datagram filter module 46 can also forward other IP datagrams. One such IP datagram is an IP datagram 44 for connection set up that can contain either (i) a SYN from a host requesting a connection to a server, (ii) a SYN and ACK from the server corresponding to the request in (i), or (iii) an ACK from the host asking for the connection.

Other types of IP datagrams 44 that can be forwarded by datagram filter module 46 can be decided by a relay table. The relay table contains one of the two combinations A and B, and the corresponding relay method (IP relay, TCP relay or Application relay). In A, an entry consists of three fields (i) source IP address that indicates the IP address of the source end-point, (ii) destination IP address that indicates the IP address of the destination end-point and (iii) flow id that indicates the flow of the packet, is used. In B, an entry consists of four fields (i) source IP address, (ii) source port that indicates the usage of transport layer connection 14 by an application at source, (iii) destination IP address and (iv) destination port that indicates the usage of transport layer connection 14 by an application at destination. If there is an entity in the relay table matching the received IP datagram 44 and the table specifies a TCP relay or an application relay the datagram 44 is forwarded to the Transport layer.

Figure 5:
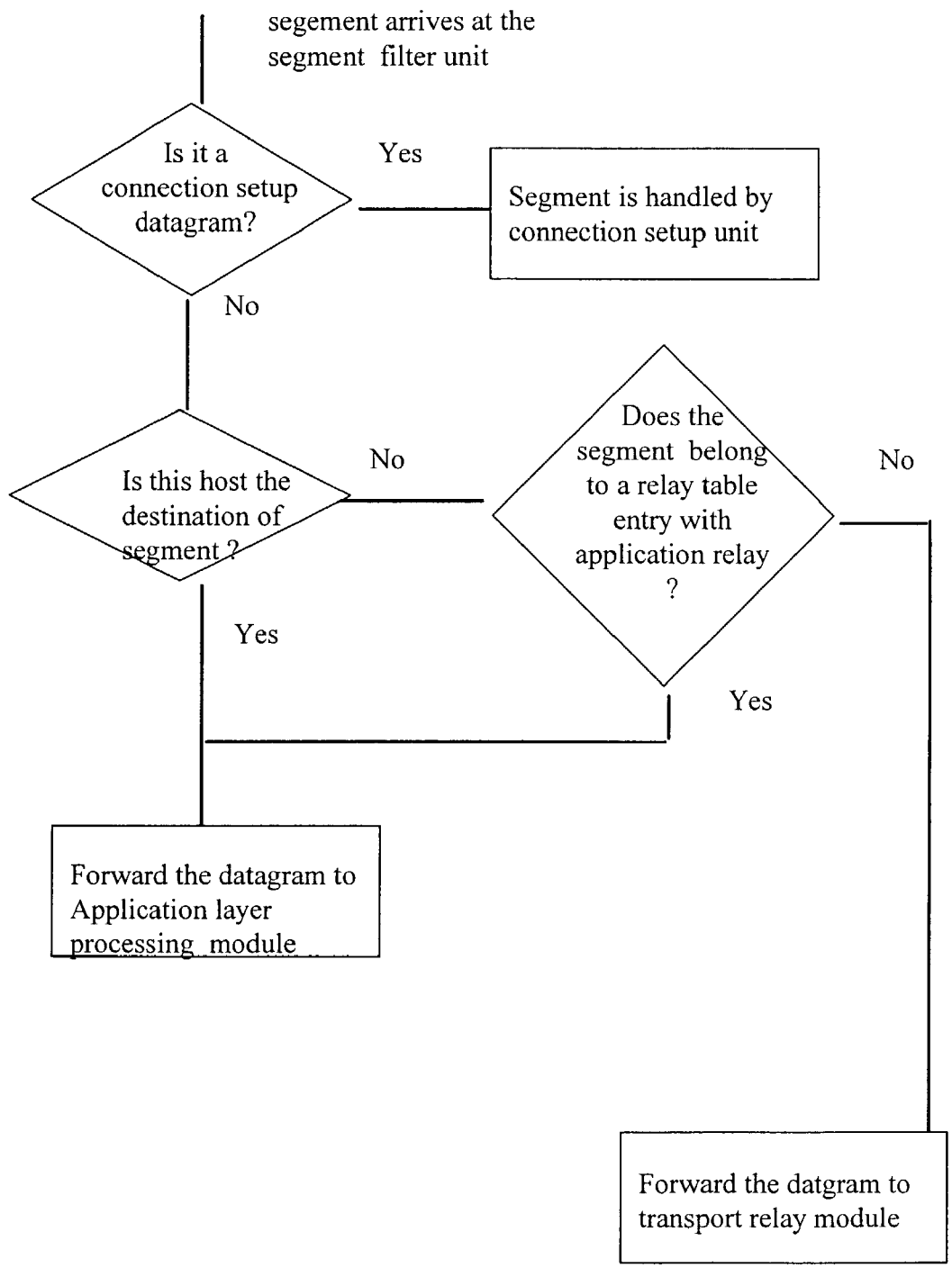
FIG. 5 is a flowchart that illustrates the working of a segment filter unit that can be utilized with various embodiments of gateway modules of the present invention.

In one embodiment, control module 56 uses a segment filter module 52, illustrated in FIG. 5. Segment filter module 52 determines whether or not to carry out the connection setup. Connection set up module 12 carries out the connection setup when segment filter module 52 receives transport layer protocol data unit 58 that contains a connection set up request. Segment filter module 52 forwards a segment to the application processing module 50 if the segment has the destination address same as the gateway host.

Segment filter module 52 can use a relay table as employed by datagram filter module 46, and forward a segment 58 if it matches an entry in the table that specifies an application relay. The working of segment filter module 52 can span across layers, as needed, to access IP addresses that are contained in a network protocol data unit 44 and not in the transport protocol data unit 58.

Datagram filter module 46, more fully illustrated in FIG. 6, can send transport layer protocol data unit 58 to a transport layer protocol processing module 40 when a transport layer protocol data unit 58 is to be relayed between first and second wire networks 20 and 22.

In one embodiment, datagram filter module 46 sends transport layer protocol data unit 58 to a transport layer protocol processing module 40 when a transport layer protocol data unit 58 is to be relayed between first and second wire networks 20 and 22 through TCP layer.

In another embodiment, segment filter module 52 and datagram filter module 46 together send an application data unit 66 to an application layer protocol processing module 50 when an application data unit 66 is to be relayed between first and second wire networks 20 and 22 through application processing module 50.

Gateway module 10 can also include an application processing module 50 that processes application data unit 66. Gateway module 10 can utilize different methods to relay data between first and second wire networks 20 and 22.

A network protocol data unit 44 may be relayed at IP layer or sent to transport protocol processing module 40 as a transport protocol data unit 58 based on filtering by the datagram filter module 46. A transport protocol data unit 58 may be relayed at transport layer or sent to application protocol processing module 50 as an application protocol data unit 66 based on filtering by the segment filter module 52. Application protocol processing module 50 can relay an application protocol data unit 66. An incoming application protocol data unit 66 is processed by application input module 68 while an outgoing application protocol data unit 66 is processed by application output module 72.

In one embodiment, segment filter module 52 sends transport layer protocol data unit 58 to application processing module 50 by referring to, (i) protocol identifier that indicates the protocol type of transport layer protocol data unit 58, (ii) source port identifier, (iii) destination port identifier, (iv) destination address, or (v) source address, when control module 56 determines that the connection set up module 12 has set up the connection through an application layer gateway module 70. This is possible by inserting a row in the relay table with an entry consisting of one or more of the above components identifying the connection and an entry for the application level relay for the above connection.

Transport layer protocol processing module 40 contains a cache module for storing protocol data and connection information. Caching is provided during movement of a mobile node from a network 22 to another network 34. The caching need not be confined to the period of movement only but can be continued until the mobile node at network 34 has achieved a full TCP speed. Caching can be utilized even when the networks for the first connection 24 and the second connection 26 or 28 are heterogeneous.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A gateway module for connecting at least a first and second network, comprising:
 a connection set up module configured to set up a transport layer connection between two correspondent nodes in the first and second networks in divided forms of first and second connections,
 a control module configured to control the connection set up module by making a determination to carry out or not carry out a connection set up by the connection set up module according to an information content of a packet that contains a transport layer protocol data unit from the correspondent node in the second network requesting a set up of the transport layer connection between the first and second networks;
 a data processing module configured to determine if data received from the correspondent node in the first network is new, and if the data received is new, buffer and forward the data to the correspondent node in the second network; and
 an acknowledgement processing module configured to acknowledge the data received from the correspondent node in the first network and process acknowledgements received from the correspondent node in the second network, wherein the processing comprises retransmitting buffered data, by the data processing module, if the correspondent node in the second network does not acknowledge forwarded data within a timeout period.

2. The module of claim 1, wherein the divided forms of first and second connections are in a transport layer protocol for communications with correspondent nodes in the first and second network.

3. The module of claim 1, wherein the control module includes a filter module.

4. The module of claim 3, wherein the filter module determines whether or not to carry out the connection setup.

5. The module of claim 4, wherein the filter module determines whether or not carry out the connection setup in response to the filter module:
  receiving the transport layer protocol data unit; and
  referring to at least one of, a port identifier that indicates a usage of the transport layer connection, a destination address, a source address, and a flow identifier that indicates a flow of the packet.

6. The module of claim 1, further comprising: a transport layer protocol processing module configured to execute processing by a transport layer protocol.

7. The module of claim 6, further comprising: a filter module configured to pass the transport layer protocol data unit to the transport layer protocol processing module.

8. The module of claim 7, wherein the filter module passes the transport layer protocol data unit to the transport layer protocol processing module when a network layer protocol data unit is to be relayed between the first and second networks.

9. The module of claim 7, wherein the filter module passes the transport layer protocol data unit to the transport layer protocol processing module by referring to at least one of a port identifier, a destination address, a source address, and a flow identifier that indicates a flow of the network layer protocol data unit.

10. The module of claim 9, wherein the filter module passes the transport layer protocol data unit to the transport layer protocol processing module in response to an indication by a protocol identifier that a protocol type of the transport layer protocol data unit is a connection oriented protocol.

11. The module of claim 9, wherein the port identifier, destination address, source address, and flow identifier are each in the network layer protocol data unit.

12. The module of claim 1, further comprising: a transport layer protocol processing module configured to execute processing of a transport layer protocol; an application processing module for processing applications; and a filter module configured to pass the transport layer protocol data unit to the application processing module.

13. The module of claim 1, wherein a divided connection at the gateway is created by the transport layer protocol processing module at a time of relaying a network layer protocol data unit between the first and second networks.

14. The module of claim 12, wherein the filter module passes the transport layer protocol data unit to the application processing module by referring to at least one of a protocol identifier indicating a protocol type of the transport layer protocol data unit, a port identifier, a destination address, a source address, and a flow identifier that indicates a flow of the network layer protocol data unit.

15. The module of claim 14, wherein the protocol identifier, port identifier, destination address, source address, and flow identifier are in the network layer protocol data unit.

16. The module of claim 14, wherein the control module determines when the connection by the application layer gateway module is to be set up by the connection set up module.

17. The module of claim 12, wherein the transport layer protocol processing module contains a cache module for storing protocol data and connection information.

18. The module of claim 17, wherein the connection set up creates the two connections, and caching is provided during movement of the correspondent node in the second network to a third network.

19. A gateway module in a communication network interconnected with a plurality of networks, comprising:
  a connection set up module for setting up a transport layer connection between first and second networks of the plurality of networks in divided forms of first and second connections in a transport layer protocol for communications with the correspondent nodes in the first and second networks,
  a control module for shifting the second connection when the correspondent node in the second network has moved from the second network to a third network, wherein the second connection is established to the attachment point of the correspondent node in the third networks;
  a data processing module configured to determine if data received from the correspondent node in the first network is new, and if the data received is new, buffering the data while the correspondent node in the second network is moving to the third network and forwarding the buffered data to the correspondent node in the third network after receiving information, by the control module, that the correspondent node in the second network has completed the move to the third network; and
  an acknowledgement processing module configured to acknowledge the data received from the correspondent node in the first network and process acknowledgements received from the correspondent node in the second and third networks, wherein the processing comprises retransmitting buffered data, by the data processing module, if the correspondent node in the second and third networks does not acknowledge forwarded data within a timeout period.

20. A gateway control method in a communication network that includes a plurality of interconnected networks, the gateway module having a connection set up module for setting up a transport layer connection between first and second networks in divided forms of first and second connections in a transport layer protocol for communications with correspondent nodes in the first and second networks, a data processing module and an acknowledgement processing module, comprising:
  using the data processing module to determine if data received over the first connection is new;
  buffering new data received over the first connection;
  forwarding buffered data, over the second connection, to the node in the second network;
  using the acknowledgement processing module to acknowledge the new data received over the first connection;
  processing, by the acknowledgement processing module, a received acknowledgement from the node in the second network that is received over the second connection; and
  in response to processing the received acknowledgement, deciding to perform a subsequent action, wherein the subseuuent action comprises retransmitting the buffered data, over the second connection, to the node in the second network.

21. The method of claim 20, wherein the subsequent action further comprises forwarding the received acknowledgement over the first connection.

22. The method of claim 20, wherein a control module decides during movement of the correspondent node in the second network to a third network whether to forward a packet meant for the correspondent node.

23. The method of claim 22, further comprising: passing information to the control module about completion of the movement by the correspondent node from the second network to the third network.

24. The method of claim 23, wherein the information causes the data processing module to forward at least a portion of cached packets to a node in the third network.

25. The method of claim 20, wherein the subsequent action further comprises discarding the received acknowledgement.

26. The method of claim 20, wherein the gateway control method operates without using multicasting.

27. The method of claim 20, wherein the decision to perform the subsequent action further comprises conducting an analysis of a first sequence number of a last correctly received packet with a second sequence number of a current packet.

* * * * *